US012728828B2

(12) United States Patent
Kim

(10) Patent No.: US 12,728,828 B2
(45) Date of Patent: Sep. 8, 2026

(54) POWER SUPPLY APPARATUS AND METHOD FOR ELECTRO-MECHANICAL BRAKE SYSTEM

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 3 days.

(21) Appl. No.: 19/057,335

(22) Filed: Feb. 19, 2025

(65) Prior Publication Data

US 2025/0368173 A1 Dec. 4, 2025

(30) Foreign Application Priority Data

May 29, 2024 (KR) ........................ 10-2024-0069815

(51) Int. Cl.

| | |
|---|---|
| ***B60T 8/88*** | (2006.01) |
| ***B60T 8/28*** | (2006.01) |
| ***B60T 8/58*** | (2006.01) |
| ***B60T 8/92*** | (2006.01) |
| ***B60T 13/74*** | (2006.01) |

(52) U.S. Cl.

CPC ................ *B60T 8/885* (2013.01); *B60T 8/28* (2013.01); *B60T 8/58* (2013.01); *B60T 8/92* (2013.01); *B60T 13/746* (2013.01); *B60T 2270/402* (2013.01); *B60T 2270/406* (2013.01)

(58) Field of Classification Search

CPC ... B60T 8/885; B60T 8/28; B60T 8/58; B60T 8/92; B60T 13/746; B60T 13/741; B60T 13/74; B60T 2270/402; B60T 2270/406; B60T 2270/414; B60T 17/221; B60R 16/03; B60Y 2306/13; B60Y 2400/81

USPC ........................................................... 701/70

See application file for complete search history.

(56) References Cited

U.S. PATENT DOCUMENTS

| | | | | |
|---|---|---|---|---|
| 8,449,048 | B2 | 5/2013 | Bourqui et al. | |
| 11,124,169 | B2 | 9/2021 | Michels et al. | |
| 12,109,999 | B2 * | 10/2024 | Kim | B60T 17/18 |
| 12,491,852 | B2 * | 12/2025 | Kim | B60T 8/92 |

(Continued)

OTHER PUBLICATIONS

Extended European Search Report issued on Oct. 1, 2025 in European Patent Application No. 25174370.4.

*Primary Examiner* — Hai H Huynh
(74) *Attorney, Agent, or Firm* — Morgan, Lewis & Bockius LLP

(57) ABSTRACT

A power supply apparatus includes a battery and a DC-DC converter converting a voltage value of the battery; a main controller determining commands required for driving and braking of a vehicle; an auxiliary controller controlling driving and braking of the vehicle when the main controller is in a function degraded status or an unfunctional status; left front, right front, left rear and right rear wheel controllers generating a braking force using an electronic mechanical brake mounted on each wheel of the vehicle; a first power line supplying power to the main controller and the left front wheel controller from a power branch point starting from the DC-DC converter; a second power line supplying power to the auxiliary controller and the right front wheel controller from the power branch point; and a third power line supplying power to the left rear and right rear wheel controllers from the power branch point.

13 Claims, 2 Drawing Sheets

(56) References Cited

U.S. PATENT DOCUMENTS

| | | | | |
|---|---|---|---|---|
| 12,522,187 | B2 * | 1/2026 | Kim ........................ | B60T 7/042 |
| 2018/0065607 | A1 | 3/2018 | Masuda | |
| 2023/0125088 | A1 | 4/2023 | Beuss | |
| 2025/0388202 | A1 * | 12/2025 | Kim ........................ | B60T 17/18 |

* cited by examiner

POWER SUPPLY APPARATUS AND METHOD FOR ELECTRO-MECHANICAL BRAKE SYSTEM

CROSS-REFERENCE TO RELATED APPLICATION

The present application claims the benefit under 35 USC § 119 (a) of Patent Application No. 10-2024-0069815, filed on May 29, 2024 in Korea, the entire disclosure of which is incorporated herein by reference for all purposes.

TECHNICAL FIELD

The present disclosure relates to a power supply apparatus and method for an electronic mechanical brake system.

BACKGROUND

The description in this section merely provides background information related to the present disclosure and does not constitute the related art.

An electronic mechanical brake system uses a pedal simulator mounted on a pedal to sense the amount of pedaling by a driver and transmits the same to a central controller. The central controller calculates the braking force required for each wheel and transmits a braking command to the wheel controllers disposed on each wheel. The wheel controllers that receive the braking command generate a braking force using a motor-based electronic mechanical brake actuator mounted on each wheel. The electronic mechanical brake system may perform active braking and independent braking of each wheel, and thus may perform functions such as ABS (anti-lock braking system), VDC (vehicle dynamic control), TCS (traction control system), and EPB (electric parking brake).

The power system for supplying power to the electronic mechanical brake system may include a plurality of power apparatus for redundancy. The power system may be connected to the electronic mechanical brakes disposed on each wheel based on an X-split structure. For example, one power apparatus may be connected to supply power to a left front wheel electronic mechanical brake and a right rear wheel electronic mechanical brake, and the other power apparatus may be connected to supply power to a right front wheel electronic mechanical brake and a left rear wheel electronic mechanical brake.

When an abnormality occurs in one of the plurality of power apparatuses, the power system according to the related art may perform backup braking with the remaining power apparatus. However, in this connection, there is an inevitable issue that 50% of the total braking force of a vehicle is lost.

SUMMARY

A main purpose of the present disclosure is directed to addressing an issue associated with the related art, and to providing a power supply apparatus for an electronic mechanical brake system that satisfies the minimum required deceleration determined based on the front and rear wheel braking distribution ratio of a vehicle when an abnormality occurs in any one of a first power line, a second power line, and a third power line.

The aspects of the present disclosure are not limited to those mentioned above, and other aspects not mentioned herein will be clearly understood by those skilled in the art from the following description.

According to an embodiment, the power supply apparatus for the electronic mechanical brake system can satisfy the minimum required deceleration determined based on the front and rear wheel braking distribution ratio of a vehicle when an abnormality occurs in any one of the first power line, the second power line, and the third power line.

DETAILED DESCRIPTION

Figure 1:
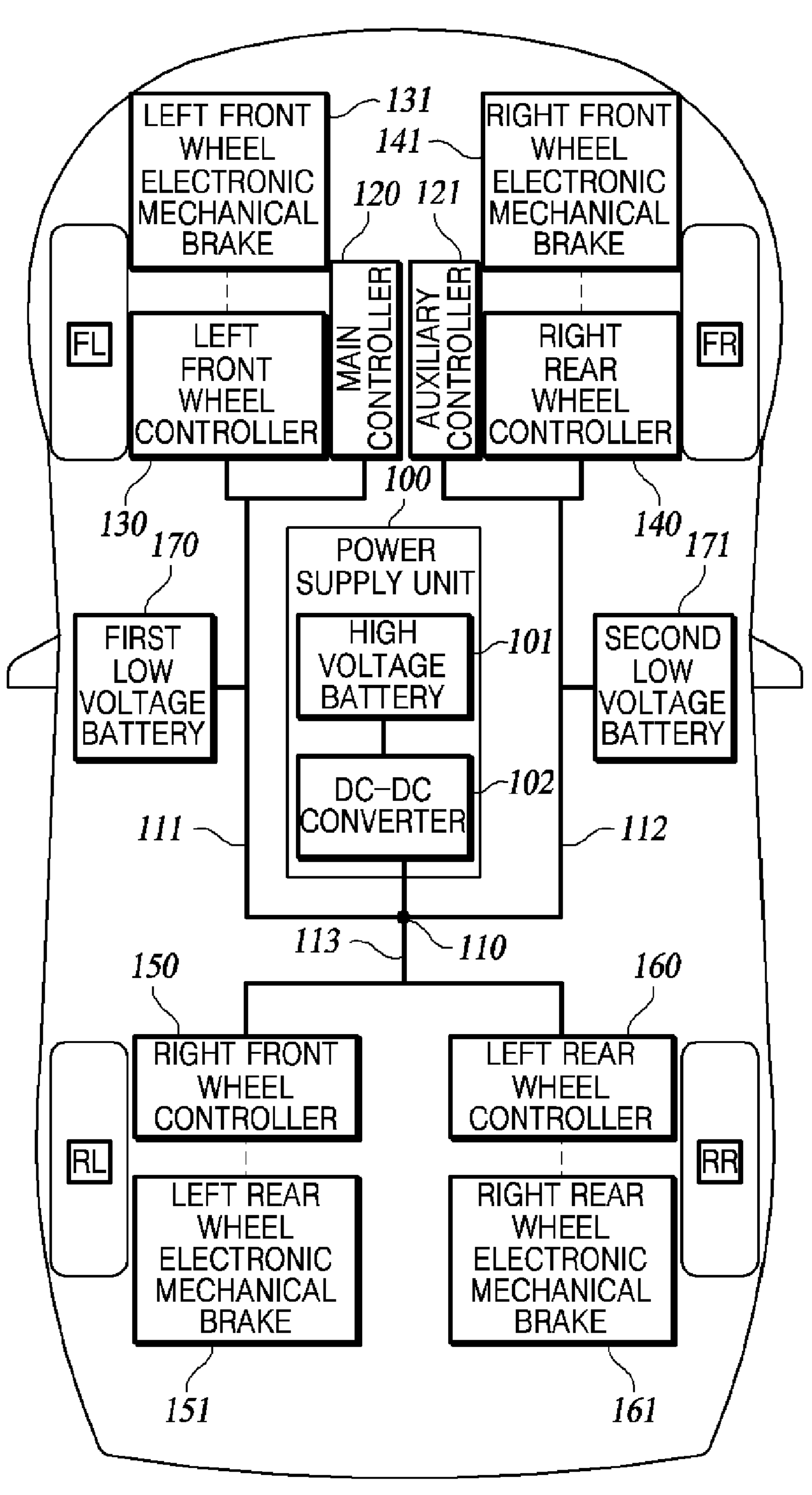
FIG. 1 is a schematic diagram illustrating a configuration of a power supply apparatus for an electronic mechanical brake system according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a schematic diagram illustrating a configuration of a power supply apparatus for an electronic mechanical brake system according to an embodiment of the present disclosure.

Referring to FIG. 1, the power supply apparatus for the electronic mechanical brake system according to an embodiment includes all or part of a power supply unit 100, a main controller 120, an auxiliary controller 121, a plurality of wheel controllers 130, 140, 150, and 160, a plurality of electronic mechanical brakes 131, 141, 151, and 161, a first low voltage battery 170, and a second low voltage battery 171.

The power supply unit 100 includes a high voltage battery 101 and a DC-DC converter 102.

The high voltage battery 101 accumulates and stores electric power input from the outside, and supplies the stored energy as power for driving a motor of a vehicle. For example, the high voltage battery 101 may be charged by converting commercial AC power input from an external electric vehicle service equipment (EVSE) into DC power for charging.

The high voltage battery 101 is charged with a DC high voltage of about 300 V to 450 V, for example, as a main power source for an electric vehicle or hybrid electric vehicle.

The DC-DC converter 102 may convert the voltage of electric energy provided from the battery of an electric vehicle (EV) or a hybrid electric vehicle (HEV) that drives by power of electricity into a voltage level suitable for various vehicle components.

The DC-DC converter 102 adjusts the output of the high voltage battery 101 to a lower voltage required by various subsystems of a vehicle. The in-vehicle systems of a vehicle, such as lighting, air conditioning, and entertainment systems, operate at, for example, 12 V. The DC-DC converter 102 converts the output of the high voltage battery 101 to a lower voltage to meet these requirements.

The main controller 120 may generate commands required for driving and braking of a vehicle. For example, the main controller 120 may receive a pedal stroke value from a pedal stroke sensor (not shown) disposed in the vehicle and generate a required braking force corresponding to the pedal stroke value.

The auxiliary controller 121 performs a redundancy function in preparation for a function degraded status or an unfunctional status of the main controller 120. When the main controller 120 is determined to be in a function degraded status or an unfunctional status, the auxiliary controller 121 may perform auxiliary control for driving and braking of a vehicle.

The plurality of wheel controllers 130, 140, 150, and 160 are disposed on each wheel. The plurality of wheel controllers 130, 140, 150, and 160 include a left front wheel controller 130, a right front wheel controller 150, a left rear wheel controller 160, and a right rear wheel controller 140.

The left front wheel controller 130, the right front wheel controller 150, the left rear wheel controller 160, and the right rear wheel controller 140 may receive a braking command determined from the main controller 120 or the auxiliary controller 121 and generate a braking force for a vehicle. However, it is not limited thereto, and the left front wheel controller 130, the right front wheel controller 150, the left rear wheel controller 160, and the right rear wheel controller 140 may independently determine the braking command required for the vehicle.

The main controller 120, the auxiliary controller 121, and the plurality of wheel controllers 130, 140, 150, and 160 according to an embodiment of the present disclosure may be an electronic control unit (ECU).

The plurality of electronic mechanical brakes 131, 141, 151, and 161 may be disposed on each wheel of a vehicle. Specifically, the plurality of electronic mechanical brakes 131, 141, 151, and 161 may be combined to pressurize brake discs disposed on each wheel of the vehicle.

The plurality of electronic mechanical brakes 131, 141, 151 and 161 may be connected to the aforementioned plurality of wheel controllers 130, 140, 150 and 160, respectively. The plurality of electronic mechanical brakes 131, 141, 151 and 161 include a left front wheel electronic mechanical brake 131, a right front wheel electronic mechanical brake 151, a left rear wheel electronic mechanical brake 161, and a right rear wheel electronic mechanical brake 141.

The left front wheel electronic mechanical brake 131, the right front wheel electronic mechanical brake 151, the left rear wheel electronic mechanical brake 161 and the right rear wheel electronic mechanical brake 141 may generate a braking force using a motor-based electronic mechanical brake actuator. The plurality of electronic mechanical brakes 131, 141, 151, and 161 may receive braking commands respectively from the plurality of wheel controllers 130, 140, 150, and 160 and generate a braking force.

The power supply apparatus for the electronic mechanical brake system according to an embodiment of the present disclosure may supply power to the main controller 120, the auxiliary controller 121, and the plurality of wheel controllers 130, 140, 150, and 160 using a first power line 111, a second power line 112, and a third power line 113.

The power line starting from the power supply unit 100 may start from a DC-DC converter 102 in the power supply unit 100 and branch from a power branch point 110 to the first power line 111, the second power line 112, and the third power line 113.

According to an embodiment, the first power line 111 is configured to supply power from the power branch point 110 formed to be supplied with power from the DC-DC converter 102 to the main controller 120 and the left front wheel controller 130.

The first low voltage battery 170 according to an embodiment is disposed on the first power line 111. The first low voltage battery 170 is configured to provide stored electric power when additional electric power is required during driving of a vehicle. For example, the first low voltage battery 170 may be used when the engine is not started or when high electric power is momentarily needed during driving of a vehicle.

The second power line 112 according to an embodiment is configured to supply power from the power branch point 110 to the auxiliary controller 121 and the right front wheel controller 150.

The second low voltage battery 171 according to an embodiment is disposed on the second power line 112. The second low voltage battery 171 is configured to provide stored electric power when additional electric power is required during driving of a vehicle. For example, the second low voltage battery 171 may be used when the engine is not started or when high electric power is momentarily needed during driving of a vehicle.

The third power line 113 according to an embodiment is configured to supply power from the power branch point 110 to the left rear wheel controller 160 and the right rear wheel controller 140.

In FIG. 1, only the first power line 111, the second power line 112, and the third power line 113 that supply power are illustrated, but the main controller 120, the auxiliary controller 121, the left front wheel controller 130, the right front wheel controller 150, the left rear wheel controller 160, and the right rear wheel controller 140 according to an embodiment of the present disclosure may transmit and receive information using an in-vehicle network (IVN). Herein, the IVN may be a controller area network (CAN) or a local CAN.

The main controller 120, the auxiliary controller 121, and the plurality of wheel controllers 130, 140, 150, and 160 according to one embodiment of the present disclosure may determine whether an abnormality has occurred in any one of the first power line 111, the second power line 112, and the third power line 113. The main controller 120, the auxiliary controller 121, and the plurality of wheel controllers 130, 140, 150, and 160 may determine whether an abnormality has occurred by periodically transmitting and receiving characteristic signals among one another.

For example, when an abnormality occurs in the first power line 111, the main controller 120 and the left front wheel controller 130 are not supplied with power, and thus are unable to feed back characteristic signals to the auxiliary controller 121, the right rear wheel controller 140, the right front wheel controller 150, and the left rear wheel controller 160. In this connection, the auxiliary controller 121, the right rear wheel controller 140, the right front wheel controller 150, and the left rear wheel controller 160 may determine that an abnormality has occurred in the first power line 111. However, this is not limited thereto, and the stage of determining whether the second power line 112 and the third power line 113 are abnormal may also be determined similarly.

The power supply apparatus for the electronic mechanical brake system according to an embodiment of the present disclosure may satisfy the minimum deceleration required for a vehicle even when an abnormality occurs in any one of the first power line 111, the second power line 112, and the third power line 113.

Generally, the braking distribution ratio of the front and rear wheels is set higher for the front wheels than for the rear wheels. This is because when a vehicle is braking, the center of gravity of the vehicle moves toward the front wheels, so the braking force required for the front wheels is higher than the braking force required for the rear wheels.

For example, the braking distribution ratio of the front and rear wheels according to an embodiment may be set to 'front wheels:rear wheels=6:4' or 'front wheels:rear wheels=7:3'. Accordingly, assuming that the sum of the maximum braking force of a vehicle is 1 g (where g is the acceleration of gravity, 9.8 m/s^2), when the braking distribution ratio of the front and rear wheels is 6:4, the left front wheel (FL) and the right front wheel (FR) may each generate 0.3 g of braking force, and the left rear wheel (RL) and the right rear wheel (RR) may each generate 0.2 g of braking force. When the braking distribution ratio of the front and rear wheels is 7:3 under the same conditions, the left front wheel (FL) and the right front wheel (FR) may each generate 0.35 g of braking force, and the left rear wheel (RL) and the right rear wheel (RR) may each generate 0.15 g of braking force. However, this is merely one example, and the braking distribution ratio of the front and rear wheels may be changed differently depending on the specifications and design of the vehicle.

In the event of an abnormality in the first power line 111, the power supply apparatus for the electronic mechanical brake system may not supply power to the main controller 120 and the left front wheel controller 130. Accordingly, the auxiliary controller 121 and the left front wheel controller 130 that receive power using the second power line 112 and the left rear wheel controller 160 and the right rear wheel controller 140 that receive power using the third power line 113 may perform emergency braking of a vehicle. When the braking distribution ratio of the front and rear wheels is assumed to be 6:4, the right rear wheel controller 140 and the left rear wheel controller 160 may each generate a braking force of 0.2 g using the right rear wheel electronic mechanical brake 141 and the left rear wheel electronic mechanical brake 161, and the right front wheel controller 150 may generate a braking force of 0.3 g using the right front wheel electronic mechanical brake 151. Accordingly, a braking performance of 0.7 g may be expected for the maximum braking force of 1 g. Assuming that the braking distribution ratio of the front and rear wheels is assumed to be 7:3, when an abnormality occurs in the first power line 111, the power supply apparatus for the electronic mechanical brake system according to an embodiment may be expected to generate a braking performance of 0.65 g for the maximum braking force of 1 g.

In the event of an abnormality in the second power line 112, the power supply apparatus for the electronic mechanical brake system may not supply power to the auxiliary controller 121 and the right front wheel controller 150. Accordingly, the main controller 120 and the left front wheel controller 130 that receive power using the first power line 111 and the left rear wheel controller 160 and the right rear wheel controller 140 that receive power using the third power line 113 may perform emergency braking of a vehicle. When the braking distribution ratio of the front and rear wheels is assumed to be 6:4, the left front wheel controller 130 may generate a braking force of 0.3 g using the left front wheel electronic mechanical brake 131, and the left rear wheel controller 160 and the right rear wheel controller 140 may each generate a braking force of 0.2 g using the left rear wheel electronic mechanical brake 161 and the right rear wheel controller 140. Accordingly, a braking performance of 0.7 g may be expected for the maximum braking force of 1 g. When the braking distribution ratio of the front and rear wheels is assumed to be 7:3, in the event of an abnormality in the second power line 112, the power supply apparatus for the electronic mechanical brake system may be expected to generate a braking performance of 0.65 g for the maximum braking force of 1 g.

In the event of an abnormality in the third power line 113, the power supply apparatus for the electronic mechanical brake system may not supply power to the left rear wheel controller 160 and the right rear wheel controller 140. Accordingly, the main controller 120 and the left front wheel controller 130 that receive power using the first power line 111 and the auxiliary controller 121 and the right front wheel controller 150 that receive power using the second power line 112 may perform emergency braking of a vehicle. Assuming that the braking distribution ratio of the front and rear wheels is 6:4, the left front wheel controller 130 and the right front wheel controller 150 may generate a braking force of 0.3 g each using the left front wheel electronic mechanical brake 131 and the right front wheel electronic mechanical brake 151. Accordingly, a braking performance of 0.6 g may be expected for the maximum braking force of 1 g. Assuming that the braking distribution ratio of the front and rear wheels is 7:3, when an abnormality occurs in the third power line 113, the power supply apparatus for the electronic mechanical brake system according to an embodiment may expect a braking performance of 0.7 g relative to the maximum braking force of 1 g.

The power supply apparatus for the electronic mechanical brake system according to an embodiment of the present disclosure can expect a braking performance of 0.5 g or more relative to the maximum braking force of 1 g of a vehicle even when an abnormality occurs in any one of the first power line 111, the second power line 112, and the third power line 113.

Figure 2:
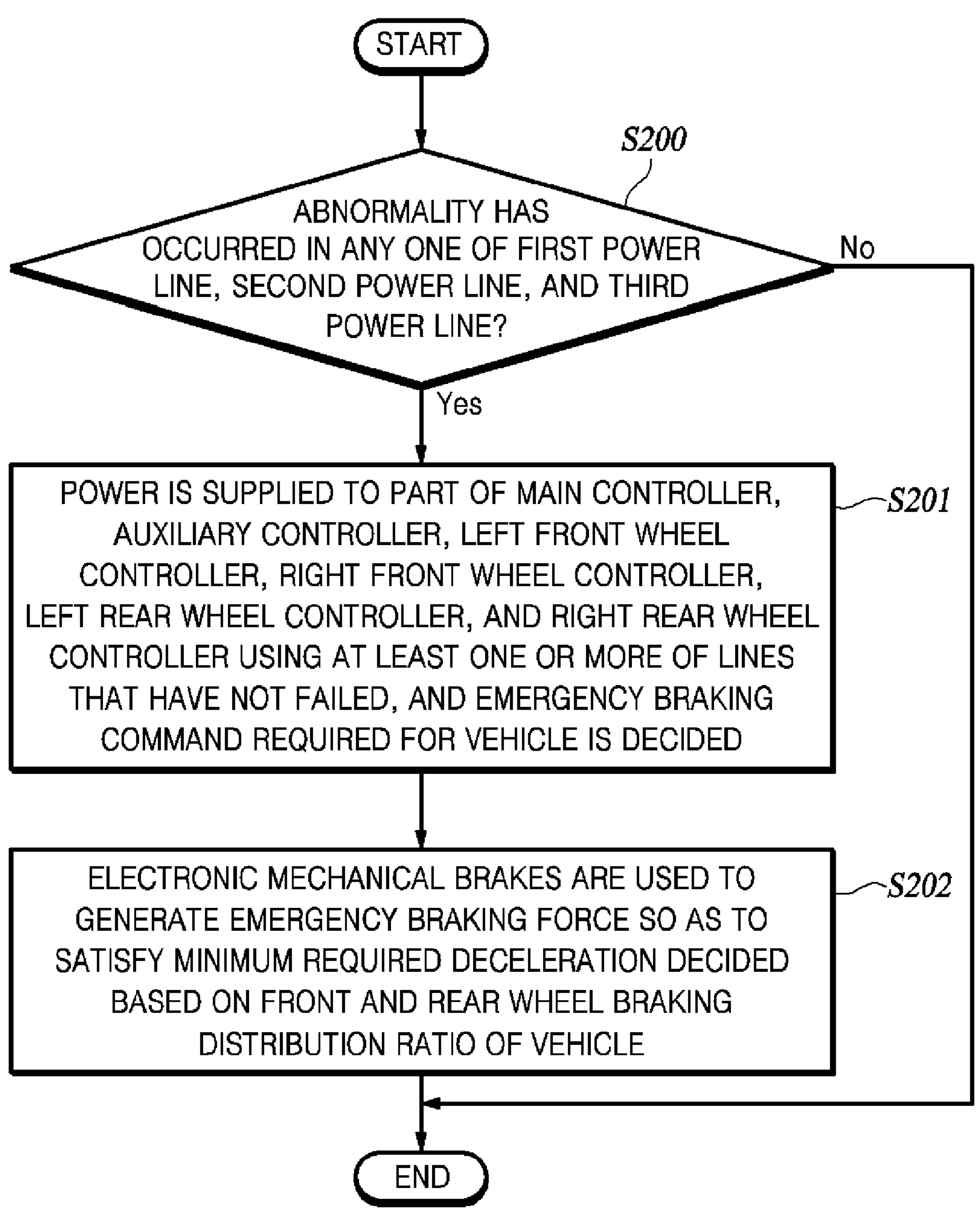
FIG. 2 is a flowchart illustrating a power supply method for an electronic mechanical brake system according to an embodiment of the present disclosure.

FIG. 2 is a flowchart illustrating a power supply method for an electronic mechanical brake system according to an embodiment of the present disclosure.

Referring to FIGS. 1 and 2, it is determined whether an abnormality has occurred in any one of the first power line 111 configured to supply power to the main controller 120 and the left front wheel controller 130 from the power branch point 110 starting from the DC-DC converter 102 that converts a voltage value of the direct current power source supplied from the high voltage battery 101 in the power supply unit 100 of a vehicle, the second power line 112 configured to supply power to the auxiliary controller 121 and the right front wheel controller 150 from the power branch point 110, and the third power line 113 configured to supply power to the left rear wheel controller 160 and the right rear wheel controller 140 from the power branch point 110 (S200).

When it is determined that an abnormality has occurred in any one of the first power line 111, the second power line 112, and the third power line 113, power is supplied to part of the main controller 120, the auxiliary controller 121, the left front wheel controller 130, the right front wheel controller 150, the left rear wheel controller 160, and the right rear wheel controller 140 of a vehicle using at least one or more of the lines that have not failed, and an emergency braking command required for the vehicle is determined (S201).

Part of the plurality of electronic mechanical brakes 131, 141, 151, and 161 that are supplied with power and respectively connected to the left front wheel controller 130, the right front wheel controller 150, the left rear wheel controller 160, and the right rear wheel controller 140 are used to generate an emergency braking force of a vehicle so as to satisfy the minimum required deceleration determined based on the front and rear wheel braking distribution ratio of the vehicle (S202). For example, in the event of an abnormality in the first power line 111, power is supplied to the auxiliary controller 121, the right front wheel controller 150, the left rear wheel controller 160, and the right rear wheel controller 140 through the second power line 112, and the third power line 113, thereby generating an emergency braking force.

For example, in the event of an abnormality in the second power line 112, power is supplied to the main controller 120, the left front wheel controller 130, the left rear wheel controller 160, and the right rear wheel controller 140 through the first power line 111 and the third power line 113, thereby generating an emergency braking force.

For example, in the event of an abnormality in the third power line 113, power is supplied to the main controller 120, the auxiliary controller 121, the left front wheel controller 130, and the right front wheel controller 150 through the first power line 111 and the second power line 112, thereby generating an emergency braking force.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A power supply apparatus for an electronic mechanical brake system, the apparatus comprising:

- a power supply unit including a high voltage battery and a DC-DC converter that converts a voltage value of a direct current power source supplied from the high voltage battery;
- a main controller configured to determine commands required for driving and braking of a vehicle;
- an auxiliary controller configured to emergency-control driving and braking of the vehicle when the main controller is in a function degraded status or an unfunctional status;
- a plurality of wheel controller including a left front wheel controller, a right front wheel controller, a left rear wheel controller, and a right rear wheel controller configured to generate a braking force using a motor-based electronic mechanical brake disposed on each wheel of the vehicle;
- a first power line configured to supply power to the main controller and the left front wheel controller from a power branch point starting from the DC-DC converter;
- a second power line configured to supply power to the auxiliary controller and the right front wheel controller from the power branch point; and
- a third power line configured to supply power to the left rear wheel controller and the right rear wheel controller from the power branch point.

2. The apparatus of claim 1, wherein the main controller, the auxiliary controller, and the plurality of wheel controllers determine whether the abnormality has occurred in any one of the first power line, the second power line, and the third power line by periodically transmitting and receiving characteristic signals among one another.

3. The apparatus of claim 2, wherein the power supply unit supplies power to the auxiliary controller, the right front wheel controller, the left rear wheel controller, and the right rear wheel controller using the second power line and the third power line to generate an emergency braking force when the abnormality occurs in the first power line.

4. The apparatus of claim 2, wherein the power supply unit supplies power to the main controller, the left front wheel controller, the left rear wheel controller, and the right rear wheel controller using the first power line and the third power line to generate an emergency braking force based on the occurrence of the abnormality in the second power line.

5. The apparatus of claim 2, wherein the power supply unit supplies power to the main controller, the auxiliary controller, the left front wheel controller, and the right front wheel controller through the first power line and the second power line to generate an emergency braking force based on the occurrence of the abnormality in the third power line.

6. The apparatus of claim 2, wherein part or all of the left front wheel controller, the right front wheel controller, the left rear wheel controller, and the right rear wheel controller generates an emergency braking force to satisfy a minimum required deceleration of the vehicle determined based on a front and rear wheel braking distribution ratio of the vehicle based on the occurrence of the abnormality in any one of the first power line, the second power line, and the third power line.

7. The apparatus of claim 2, further comprising:

a first low voltage battery disposed on the first power line and configured to provide stored electric power based on requirement for additional electric power for driving the vehicle; and a second low voltage battery disposed on the second power line and configured to provide stored electric power based on requirement for additional electric power for driving the vehicle.

8. A power supply method for an electronic mechanical brake system, the method comprising:

determining whether an abnormality has occurred in any one of a first power line configured to supply power to a main controller and a left front wheel controller from a power branch point starting from a DC-DC converter that converts a voltage value of a direct current power source supplied from a high voltage battery in a power supply unit of a vehicle, a second power line configured to supply power to an auxiliary controller and a right front wheel controller from the power branch point, and a third power line configured to supply power to a left rear wheel controller and a right rear wheel controller from the power branch point;

when it is determined that an abnormality has occurred in any one of the first power line, the second power line, and the third power line, supplying power to part of the main controller, the auxiliary controller, the left front wheel controller, the right front wheel controller, the left rear wheel controller, and the right rear wheel controller of the vehicle using at least one or more of the first, second and third power lines that have not failed, and determining an emergency braking command required for the vehicle; and generating, according to the emergency braking command, an emergency braking force of the vehicle by using part of the electronic mechanical brakes that are supplied with power and respectively connected to the left front wheel controller, the right front wheel controller, the left rear wheel controller, and the right rear wheel controller to satisfy a minimum required deceleration determined based on a front and rear wheel braking distribution ratio of the vehicle.

9. The method of claim 8, wherein the main controller, the auxiliary controller, and the left front wheel controller, the right front wheel controller, the left rear wheel controller, and the right rear wheel controller determine whether the abnormality has occurred in any one of the first power line, the second power line, and the third power line by periodically transmitting and receiving characteristic signals among one another.

10. The method of claim 9, wherein the generating of the emergency braking force of the vehicle by using part of the electronic mechanical brakes that are supplied with power and respectively connected to the left front wheel controller, the right front wheel controller, the left rear wheel controller, and the right rear wheel controller to satisfy the minimum required deceleration determined based on the front and rear wheel braking distribution ratio of the vehicle includes:

generating the emergency braking force by supplying power to the auxiliary controller, the right front wheel controller, the left rear wheel controller, and the right rear wheel controller through the second power line and the third power line based on the occurrence of the abnormality in the first power line.

11. The method of claim 9, wherein the generating of the emergency braking force of the vehicle by using part of the electronic mechanical brakes that are supplied with power and respectively connected to the left front wheel controller, the right front wheel controller, the left rear wheel controller, and the right rear wheel controller to satisfy the minimum required deceleration determined based on the front and rear wheel braking distribution ratio of the vehicle includes:

generating the emergency braking force by supplying power to the main controller, the left front wheel controller, the left rear wheel controller, and the right rear wheel controller through the first power line and the third power line based on the occurrence of the abnormality in the second power line.

12. The method of claim 9, wherein the generating of the emergency braking force of the vehicle by using part of the electronic mechanical brakes that are supplied with power and respectively connected to the left front wheel controller, the right front wheel controller, the left rear wheel controller, and the right rear wheel controller to satisfy the minimum required deceleration determined based on the front and rear wheel braking distribution ratio of the vehicle includes:

generating the emergency braking force by supplying power to the main controller, the auxiliary controller, the left front wheel controller, and the right front wheel controller through the first power line and the second power line based on the occurrence of the abnormality in the third power line.

13. A non-transitory computer readable storage medium on which a program for performing the method of claim 8 is recorded.

* * * * *